United States Patent [19]

Mori et al.

[11] Patent Number: 5,206,826

[45] Date of Patent: Apr. 27, 1993

[54] FLOATING-POINT DIVISION CELL

[75] Inventors: Junji Mori, Yokohama; Masato Nagamatsu, Ooita; Itaru Yamazaki, Yokohama; Yoshihisa Kondo, Sagamihara; Nobuhiro Ide; Takeshi Yoshida, both of Tokyo, all of Japan

[73] Assignee: Kabushiki Kaisha Toshiba, Kawasaki, Japan

[21] Appl. No.: 787,926

[22] Filed: Nov. 6, 1991

[30] Foreign Application Priority Data

Nov. 7, 1990 [JP] Japan ............................ 2-299942

[51] Int. Cl.$^5$ ........................... G06F 7/38; G06F 7/52
[52] U.S. Cl. ................................ 364/748; 364/761; 364/766
[58] Field of Search ............... 364/748, 761, 764–767

[56] References Cited

U.S. PATENT DOCUMENTS

| | | | |
|---|---|---|---|
| 4,722,069 | 1/1988 | Ikeda | 364/767 |
| 4,996,660 | 2/1991 | Beacom et al. | 364/748 |
| 5,097,435 | 3/1992 | Takahashi | 364/766 |
| 5,105,378 | 4/1992 | Mori | 364/761 |

OTHER PUBLICATIONS

Hwang *Standard Handbook for Electronic Engineers* Chap. 7, Sec. 9: 236–240 (Computer No Kousoku Enzan Houshiki), Sep. 1, 1980.

*Primary Examiner*—Tan V. Mai
*Attorney, Agent, or Firm*—Foley & Lardner

[57] ABSTRACT

A floating-point division cell consisting of partial remainder data register for storing parallel-partial-remainder data or third partial remainder data, divisor data register for storing parallel-divisor data or third divisor data, low-order divisor data generator for receiving the low-order portion of the divisor data and generating low-order divisor data, low-order partial remainder calculator for obtaining low-order multi-divisor data by multiplying the low-order divisor data and a multiple of 2 together and calculating new low-order partial remainder data by subtracting or adding the low-order multi-divisor data from/to the low-order portion of the partial remainder data, high-order divisor data generator for receiving the high-order portion of the divisor data and generating high-order divisor data, and high-order partial remainder calculator for obtaining high-order multi-divisor data by multiplying the high-order divisor data and a multiple of 2 together and calculating new high-order partial remainder data by subtracting or adding the high-order multi-divisor data from/to the high-order portion of the partial remainder data.

3 Claims, 4 Drawing Sheets

FLOATING-POINT DIVISION CELL

BACKGROUND OF THE INVENTION

1. Field of the Invention

The present invention relates to a floating-point division cell in which a partial remainder is divided by a divisor, and, in particular, to a repetitive type floating-point division cell which comprises adding/subtracting units, selectors and divisor generators.

2. Description of Background

Generally, to perform multiplication at a high speed in a multiplier, an algorithm such as a secondary Booth and a Wallace tree is provided. However, the algorithm is not provided in a divider. Therefore, a repetitive type division method is generally utilized in the divider as follows.

In the repetitive type division method, a dividend is first compared with a divisor, and then a multi-divisor which is obtained by multiplying the divisor and a multiple of 2 together is subtracted from or added to the dividend according to a sign accompanying the dividend. As a result, a partial remainder is obtained. Thereafter, the partial remainder is repeatedly subtracted or added by a new multi-divisor to calculate a new partial remainder. Finally, a quotient determined by dividing the dividend by the divisor is obtained in the divider. That is, the above method is the same as a calculation method performed by hand.

On the other hand, the Newton-Raphson method is generally utilized to converge the quotient. However, in the Newton-Raphson method, a first approximation of the quotient is subtracted by a value stored in a read only memory. In addition, multiplication steps are performed to converge the quotient, while the multi-divisor calculated according to the repetitive type division method is obtained by shifting the divisor without performing the multiplication.

Accordingly, the Newton-Raphson method is not superior to the repetitive type division method because the multiplication is required in the Newton-Raphson method. Therefore, the repetitive type division method is considered in this specification rather than the Newton-Raphson method.

A report ("A High Speed Calculation Method for Computers" written by Kai Hwang, translated by Horikoshi in Japan, published by Kindaikagaku Corporation in Japan on Sep. 1, 1980 describes repetitive type calculation methods such as a recovery type division method, a non-recovery type division method, a high radix and non-recovery type division method, and the like.

However, these methods are based upon one common basic method. That is, the circuits used in these methods comprise adding/subtracting units, selectors and the like in common. Therefore, the size of each circuit can be reduced. Moreover, the number of clock signals for synchronizing the operations performed in the adding/subtracting units can be reduced by setting the adding/subtracting units in an array.

Generally, besides a calculation utilizing the above divider, a floating-point representation is often utilized in calculations performed in a computer. The reason is that the range calculated in the computer can be considerably extended. Moreover, several types of floating-point processors have been developed to efficiently perform floating-point calculations.

Figure 1:
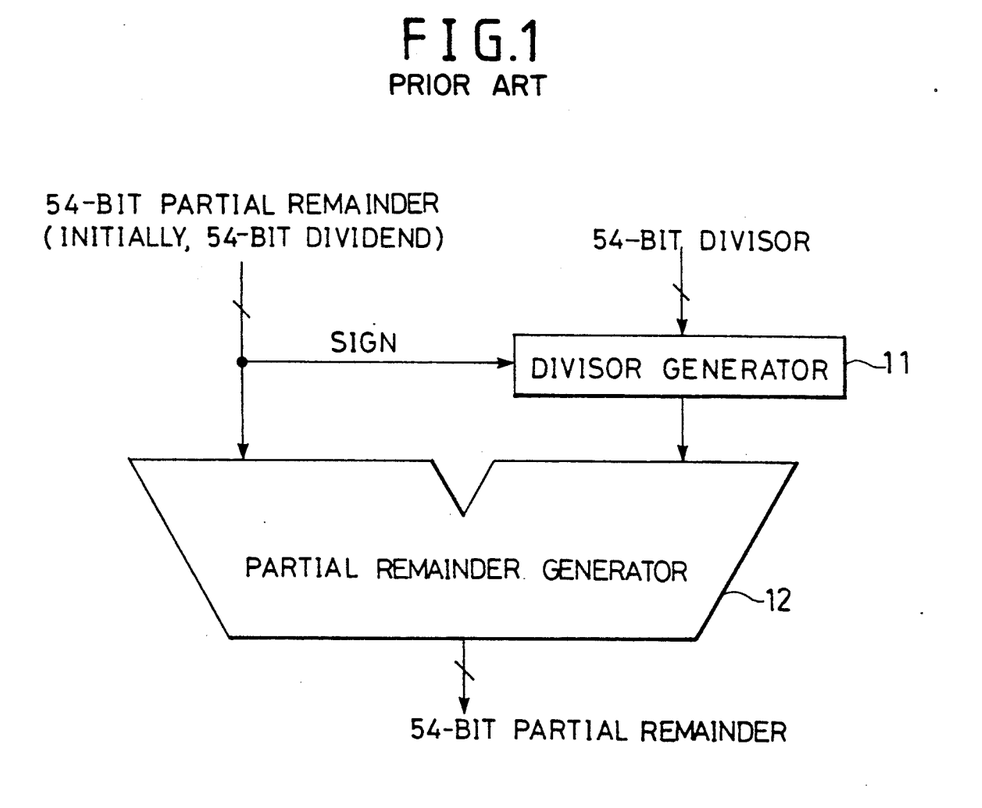
FIG. 1 is a block diagram of a conventional floating-point division cell, an array of conventional division cells constituting a conventional floating-point divider arranged in a floating-point processor.

FIG. 1 is a block diagram of a conventional floating-point division cell, an array of conventional division cells constituting a conventional floating-point divider arranged in a floating-point processor.

As shown in FIG. 1, a conventional floating-point division cell comprises:

a divisor generator 11 for generating a divisor with a sign accompanying a partial remainder; and a partial remainder generator 12 for generating a multi-divisor obtained by multiplying the divisor generated by the divisor generator 11 and a multiple of 2 together, adding the multi-divisor to the partial remainder or subtracting the multi-divisor from the partial remainder, and generating a new partial remainder.

In the above configuration, the multi-divisor is subtracted from or added to the partial remainder once in each division cell.

Therefore, by utilizing an array of conventional division cells, a dividend is first processed in a first division cell to calculate a first partial remainder. Thereafter, a new partial remainder is obtained in the following division cell. As a result, a quotient is obtained in the final division cell.

In the floating-point processor structured by the above cell, two types of modes—a single-precision mode and a double-precision mode—are generally utilized. Generally, data formed by the double-precision mode has a 64-bit length, while data formed by the single-precision mode has a 32-bit length.

However, in the floating-point method utilizing the single-precision mode, an exponent section and a fraction section are provided in the 32-bit data. Therefore, the precision of the arithmetic in which the fractions are processed is inferior to the precision of a fixed-point arithmetic.

Moreover, in a processor such as a RISC processor in which a pipeline calculation is performed, a calculation not influencing the pipeline is required. However, in cases where an internal bus arranged in the floating-point processor is formed with a prescribed width applicable to the single-precision calculation, an adverse influence is exerted on the pipeline calculation when the double-precision calculation is performed in the floating-point processor.

To prevent the above adverse influence, the internal bus is provided with a large width applicable to double-precision calculations to connect the registers with arithmetical units so that the adverse influence is not exerted on the pipeline calculation performed in the floating-point processor.

In the above floating-point processor with the internal bus applicable to double-precision calculations, in cases where a single-precision calculation is performed, "0" bits are provided in low-order bit fields which are not utilized for the single-precision calculation. Therefore, in the single-precision calculation, half the data is not used so that half of the circuit is not required.

SUMMARY OF THE INVENTION

An object of the present invention is to provide, with due consideration to the drawbacks of such a conventional floating-point division cell, a floating-point division cell for which a circuit is efficiently utilized without increasing its size even if both single-precision calculations and double-precision calculations are selectively performed.

This object is achieved by the provision of a floating-point division cell for calculating new partial remainder data by subtracting or adding multi-divisor data, which is obtained by multiplying divisor data incorporated in a divisor format and a multiple of 2 together, from/to partial remainder data in which sign data is attached to the highest digit of a remainder format, comprising:

partial remainder data storing means for storing either parallel-partial-remainder data, in which first partial remainder data is incorporated in a high-order section of the remainder format and second partial remainder data is incorporated in a low-order section of the remainder format, or third partial remainder data incorporated in an entire section of the remainder format;

divisor data storing means for storing either parallel-divisor data, in which first divisor data corresponding to the first partial remainder data is incorporated in a high-order section of the divisor format and second divisor data corresponding to the second partial remainder data is incorporated in a low-order section of the divisor format, or third divisor data, corresponding to the third partial remainder, in an entire section of the divisor format;

sign selecting means for selecting the sign data attached to the second partial remainder data in cases where the parallel-partial-remainder data is stored in the partial remainder data storing means and selecting the sign data attached to the third partial remainder data in cases where the third partial remainder data is stored in the partial remainder data storing means, the selection of the sign data being controlled by an external control signal;

low-order divisor data generating means for receiving both the sign data selected in the sign selecting means and the low-order portion of the divisor data stored in the divisor data storing means and generating low-order divisor data with the sign data;

low-order partial remainder calculating means for
(1) obtaining low-order multi-divisor data by multiplying the low-order divisor data with the sign data generated in the low-order divisor data generating means and a multiple of 2 together and
(2) calculating new low-order partial remainder data by subtracting or adding the low-order multi-divisor data from/to the low-order portion of the partial remainder data stored in the partial remainder data storing means;

carry data selecting means for
(1) selecting carry data carried by the calculation performed in the low-order partial remainder calculating means in cases where the third partial remainder data is stored in the partial remainder data storing means and
(2) selecting a "0" bit in cases where the parallel-partial-remainder data is stored in the partial remainder data registering means, the selection of either the carry data or the "0" bit being controlled by the external control signal;

high-order divisor data generating means for receiving both the sign data attached to the first or third divisor data stored in the partial remainder data storing means and the high-order portion of the divisor data stored in the divisor data storing means and generating high-order divisor data with the sign data; and high-order partial remainder calculating means for
(1) obtaining high-order multi-divisor data by multiplying the high-order divisor data with the sign data generated in the high-order divisor data generating means and a multiple of 2 together,
(2) calculating new high-order partial remainder data by subtracting or adding the high-order multi-divisor data from/to the high-order portion of the partial remainder data stored in the partial remainder data storing means, and
(3) adding either the carry data or the "0" bit selected by the carry data selecting means to the lowest digit of the new high-order partial remainder data.

In the above configuration, the operation in the floating-point cell is described in two cases.

First, in cases where the division operation according to the single-precision mode is performed in the floating-point cell, the first and second partial remainder data are stored in the partial remainder data storing means in parallel. That is, the first partial remainder data is equal to the high-order portion of the partial remainder data stored in the partial remainder data storing means. Moreover, the second partial remainder data is equal to the low-order portion of the partial remainder data stored in the partial remainder data storing means.

In the highest digit of the first and second partial remainder data, the sign data is attached to designate the addition operation or the subtraction operation performed in the high-order and low-order partial remainder calculating means. Moreover, the first and second divisor data are stored in the divisor data storing means in parallel. That is, the first divisor data is equal to the high-order portion of the divisor data stored in the divisor data storing means. Moreover, the second divisor data is equal to the low-order portion of the divisor data stored in the divisor data storing means. In addition, the first remainder data is divided by the first divisor data, while the second remainder data is divided by the second divisor data.

Thereafter, the sign data attached to the first partial remainder data and the first divisor data are transmitted to the high-order divisor data generating means so that the high-order divisor data with the sign data is generated. Then, the high-order divisor data with the sign data generated in the high-order divisor data generating means is transmitted to the high-order partial remainder calculating means. In addition, the first partial remainder stored in the partial remainder data storing means is transmitted to the high-order partial remainder calculating means.

Therefore, in the high-order partial remainder calculating means, the high-order multi-divisor data with the sign data is obtained by multiplying the high-order divisor data with the sign data and a multiple of 2 together. Then, the new high-order partial remainder data is calculated by subtracting or adding the high-order multi-divisor data with the sign data from/to the first partial remainder data.

On the other hand, two pieces of sign data attached to the second partial remainder data and the first partial remainder data are transmitted to the sign selecting means. In the sign selecting means, the sign data attached to the second partial remainder data is selected under the control of the external control signal so that the selected sign data is transmitted to the low-order divisor data generating means. In addition, the second divisor data is transmitted to the low-order divisor data generating means.

The low-order divisor data with the sign data is generated in the low-order divisor data generating means. The low-order divisor data with the sign data generated in the low-order divisor data generating means is then transmitted to the low-order partial remainder calculating means. In addition, the second partial remainder stored in the partial remainder data storing means is transmitted to the low-order partial remainder calculating means.

In the low-order partial remainder calculating means, the new low-order partial remainder data is calculated in the same manner as in the high-order partial remainder calculating means.

Thereafter, the new high-order partial remainder data calculated in the high-order partial remainder calculating means is transmitted to the partial remainder data storing means and incorporated in the high-order section of the remainder format. In addition, the new low-order partial remainder data calculated in the low-order partial remainder calculating means is transmitted to the partial remainder data storing means and incorporated in the low-order section of the remainder format.

Therefore, the new high-order partial remainder data and the new low-order partial remainder data are respectively divided by the corresponding divisor data once more.

Second, in cases where the division operation according to the double-precision mode is performed in the floating-point cell, the third partial remainder data is stored in the partial remainder data storing means. In addition, the third divisor data is stored in the divisor data storing means. The third partial remainder data is divided by the third divisor data to obtain new partial remainder data as described hereinafter.

Thereafter, the high-order portion of the third partial remainder data is transmitted to the high-order partial remainder data calculating means, while the low-order portion of the third partial remainder data is transmitted to the low-order partial remainder data calculating means. Moreover, the high-order portion of the third divisor data is transmitted to the high-order divisor data generating means, while the low-order portion of the third divisor data is transmitted to the low-order divisor data generating means. Further, both the sign data attached to the third partial remainder data and a bit arranged as the highest digit in the low-order portion of the third partial remainder data are transmitted to the sign selecting means. In the sign selecting means, the sign data attached to the third partial remainder data is selected under the control of the external control signal so that the selected sign data is transmitted to the low-order divisor data generating means.

In the low-order divisor data generating means, by combining the sign data selected by the sign selecting means with the low-order portion of the third divisor data, the low-order divisor data with the sign data is generated. In the same manner, in the high-order divisor data generating means, the sign data attached to the high-order portion of the third partial remainder data is received, and then the high-order divisor data with the sign data is generated.

Thereafter, in the low-order partial remainder calculating means, the low-order portion of the new third partial remainder data is calculated while utilizing the low-order divisor data with the sign data generated in the low-order divisor data generating means in the same manner as in the single-precision mode. In addition, the carry data generated in the low-order partial remainder calculation means is transmitted to the high-order partial remainder calculating means through the carry data selecting means under the control of the external control signal.

On the other hand, in the high-order partial remainder calculating means, the high-order portion of the new third partial remainder data is calculated while utilizing the high-order divisor data with the sign data generated in the high-order divisor data generating means in the same manner as in the single-precision mode. In addition, the carry data transmitted from the carry data selecting means is added to the lowest digit of the new high-order partial remainder data.

Thereafter, the high-order portion of the new third partial remainder data calculated in the high-order partial remainder calculating means is transmitted to the partial remainder data storing means and incorporated in the high-order section of the remainder format. In addition, the low-order portion of the new third partial remainder data calculated in the low-order partial remainder calculating means is transmitted to the partial remainder data storing means and incorporated in the low-order section of the remainder format.

Therefore, the new third partial remainder data obtained by combining the high-order portion of the new third partial remainder data with the low-order portion of the new third partial remainder data is divided by the third divisor data obtained by combining the high-order portion of the third divisor data with the low-order portion of the third divisor data once more.

Accordingly, for example, by setting a plurality of floating-point cells in an array, the dividend data provided to the partial remainder data storing means arranged in the first floating-point cell can be subtracted or added by the multi-divisor data to calculate partial remainder data. Thereafter, the partial remainder data can repeatedly be subtracted from or added to the other multi-divisor data in the following floating-point cells to finally obtain the quotient data.

DETAILED DESCRIPTION OF THE PREFERRED EMBODIMENTS

Preferred embodiments of a floating-point division cell according to the present invention are described with reference to FIGS. 2 to 6.

Figure 2:
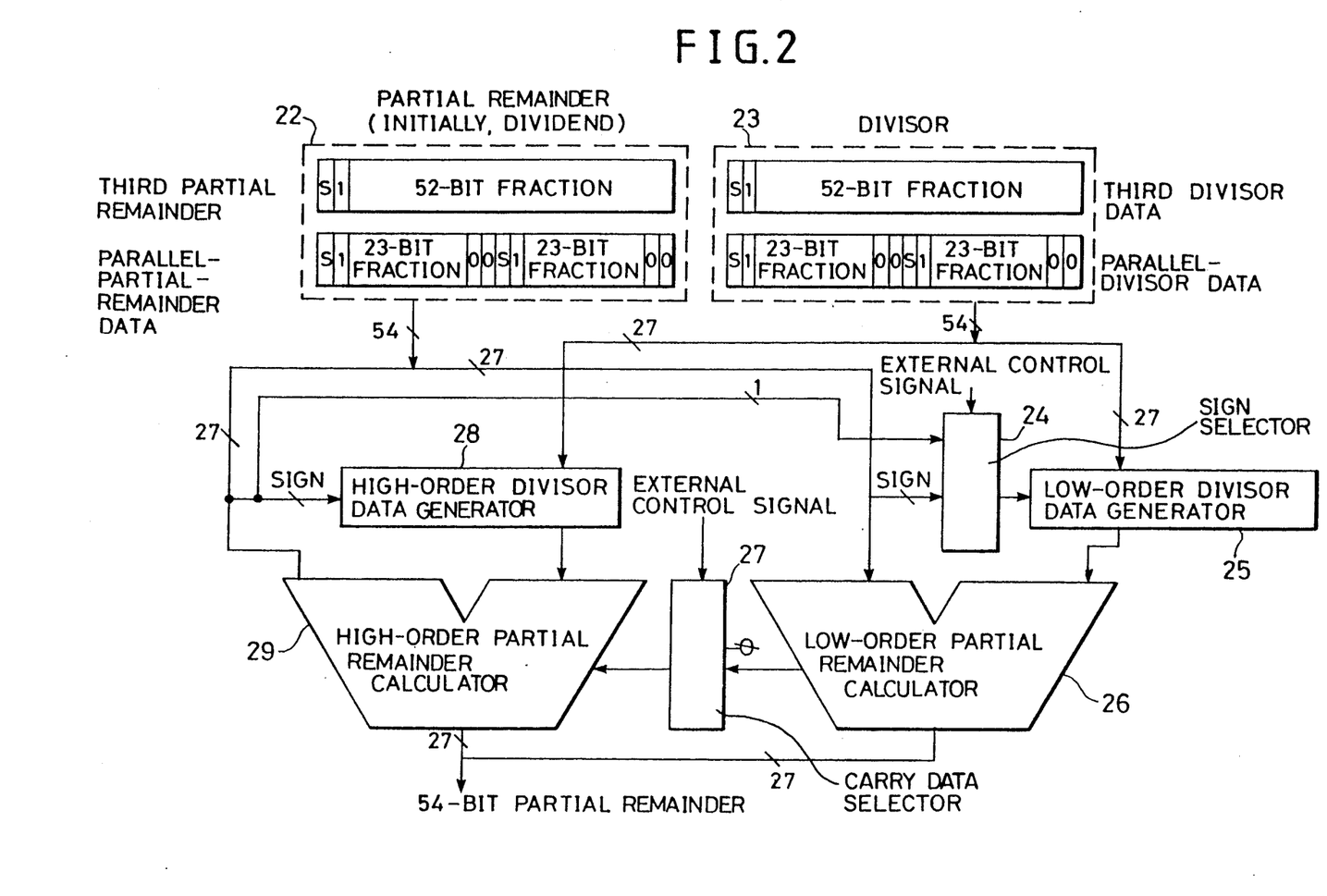
FIG. 2 is a block diagram of a floating-point division cell according to an embodiment of the present invention, a non-recovery type floating-point divider being incorporated in the cell.

FIG. 2 is a block diagram of a floating-point division cell according to an embodiment of the present invention, a non-recovery type floating-point divider being incorporated in the cell.

As shown in FIG. 2, a floating-point division cell 21 for calculating new partial remainder data by subtracting or adding multi-divisor data obtained by multiplying divisor data incorporated in a divisor format and a multiple of 2 together from/to partial remainder data (or dividend data in a first calculation) in which sign data is incorporated in the highest digit of a remainder format, comprises:

a partial remainder data register 22 for storing either parallel-partial-remainder data, in which first partial remainder data is incorporated in a high-order section of the remainder format and second partial remainder data is incorporated in a low-order section of the remainder format, or third partial remainder data incorporated in an entire section of the remainder format;

a divisor data register 23 for storing either parallel-divisor data, in which first divisor data corresponding to the first partial remainder data is incorporated in a high-order section of the divisor format and second divisor data corresponding to the second partial remainder data is incorporated in a low-order section of the divisor format, or third divisor data, corresponding to the third partial remainder, in an entire section of the divisor format;

a sign selector 24 for selecting the sign data attached to the second partial remainder data in cases where the parallel-partial-remainder data is stored in the partial remainder data register 22 and selecting the sign data attached to the third partial remainder data in cases where the third partial remainder data is registered in the partial remainder data register 22, the selection of the sign data being controlled by an external control signal;

a low-order divisor data generator 25 for receiving both the sign data selected in the sign selector 24 and the low-order portion of the divisor data stored in the divisor data register 23 and generating low-order divisor data with the sign data;

low-order partial remainder calculator 26 for
(1) obtaining low-order multi-divisor data by multiplying the low-order divisor data with the sign data generated in the low-order divisor data generator 25 and a multiple of 2 together and
(2) calculating new low-order partial remainder data by subtracting or adding the low-order multi-divisor data from/to the low-order portion of the partial remainder data stored in the partial remainder data register 22;

a carry data selector 27 for
(1) selecting carry data carried by the calculation performed in the low-order partial remainder calculator 26 in cases where the third partial remainder data is stored in the partial remainder data register 22 and
(2) selecting a "0" bit in cases where the parallel-partial-remainder data is stored in the partial remainder data register 22, the selection of either the carry data or the "0" bit being controlled by the external control signal;

a high-order divisor data generator 28 for receiving both the sign data attached to the first or third divisor data stored in the partial remainder data register 22 and the high-order portion of the divisor data stored in the divisor data register 23 and generating high-order divisor data with the sign data; and a high-order partial remainder calculator 29 for
(1) obtaining high-order multi-divisor data by multiplying the high-order divisor data with the sign data generated in the high-order divisor data generator 28 and a multiple of 2 together,
(2) calculating new high-order partial remainder data by subtracting or adding the high-order multi-divisor data from/to the high-order portion of the partial remainder data stored in the partial remainder data register 22, and
(3) adding either the carry data or the "0" bit selected by the carry data selector 27 to the lowest digit of the new high-order partial remainder data.

In the configuration of the floating-point division cell 21 shown in FIG. 2, an exponent data calculator for calculating exponent data existing in the floating-point representation is omitted because the calculation for processing the exponent data is simple and well-known. Therefore, in the floating-point division cell 21, the fraction data stored in the partial remainder data register 22 is divided by the divisor data.

Moreover, the floating-point division cell 21 is assembled in accordance with single-precision and double-precision formats defined by the IEEE754.

Before the operation performed in the floating-point division cell 21 is described, the single-precision and double-precision formats defined by the IEEE754 and the remainder and divisor formats utilized in the floating-point division cell 21 are described.

Figure 3:
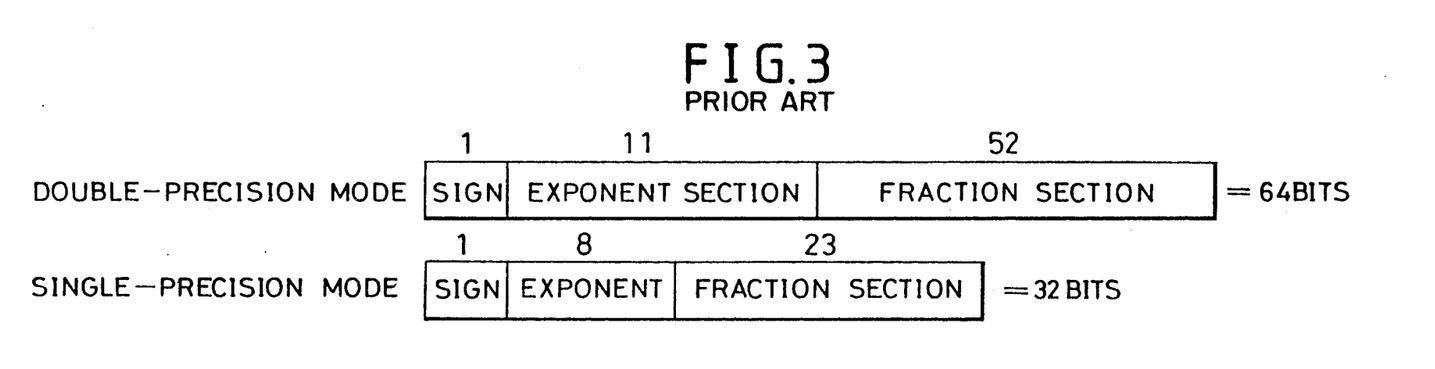
FIG. 3 shows a single-precision format and a double-precision format defined by the IEEE754.

FIG. 3 shows the single-precision and double-precision formats defined by the IEEE754.

As shown in FIG. 3, a bit field format represented by the double-precision mode comprises:

a sign section in which a sign is incorporated in a single bit arranged to the highest digit;

an exponent section in which an exponent is incorporated in the following 11 bits; and a fraction section in which a fraction such as a dividend or a divisor is incorporated in the following 52 bits.

Therefore, the bit field format represented by the double-precision mode occupies 64 bits in all.

Moreover, a bit field format represented by the single-precision mode comprises:

a sign section in which a sign is incorporated in a single bit positioned at the highest digit;

an exponent section in which an exponent is incorporated in the following 8 bits; and a fraction section in which a fraction such as a dividend or a divisor is incorporated in the following 23 bits.

Therefore, the bit field format represented by the single-precision mode occupies 32 bits in all.

The bit field formats represented by the single-precision and double-precision modes are generally utilized in a floating-point processor structured by the floating-point cell. That is, The data incorporated in the formats defined by the IEEE754 is stored in a prescribed memory section and read out through an internal bus to a prescribed application processor such as the floating-point processor.

In the floating-point processor, pieces of required data such as sign data and fraction data are read out to be respectively stored in the partial remainder data register 22 and the divisor data register 23.

Figure 4A:
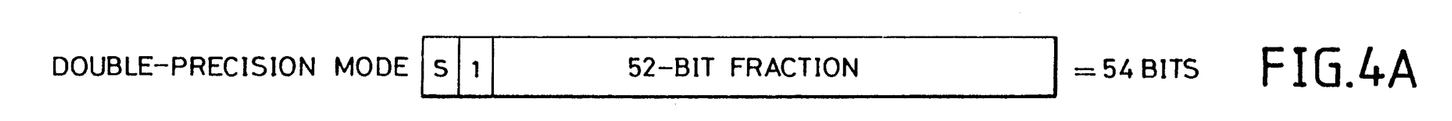
FIG. 4A shows a bit format incorporating sign data and fraction data in a double-precision mode, the sign data and the fraction data being stored in a partial remainder data register or a divisor data register constituting the floating-point division cell shown in FIG. 2.

FIG. 4A shows a bit format incorporating the sign data and the fraction data in the double-precision mode, the sign data and the fraction data being stored in the partial remainder data register 22 or the divisor data register 23.

Figure 4B:
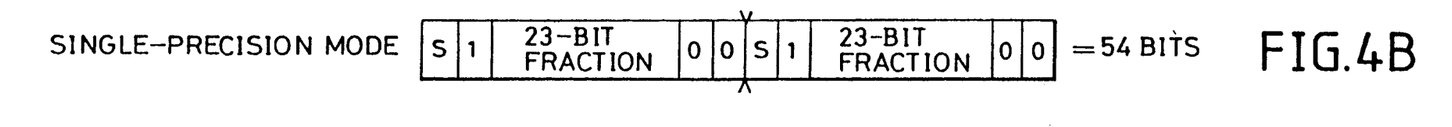
FIG. 4B shows a bit format incorporating sign data and fraction data in a single-precision mode, the sign data and the fraction data being stored in a partial remainder data register or a divisor data register constituting the floating-point division cell shown in FIG. 2.

Moreover, FIG. 4B shows a bit format incorporating the sign data and the fraction data in the single-precision mode, the sign data and the fraction data being stored in the partial remainder data register 22 or the divisor data register 23.

As shown in FIG. 4A, a bit format for incorporating the fraction data in the double-precision mode comprises:

a sign bit field for incorporating sign data indicating a sign of the dividend data, the sign bit field being assigned a single bit positioned at the highest digit;

a hidden bit field for incorporating a hidden bit "1" indicating an integral value added to the fraction data, the hidden bit "1" being required for an actual calculation; and a fraction bit field for incorporating the fraction data such as the dividend data or the divisor data.

Therefore, the bit field format represented by the double-precision mode occupies 54 bits in all.

Moreover, as shown in FIG. 4B, a bit format for incorporating two pieces of fraction data in the single-precision mode comprises a high-order section and a low-order section, each section consisting of:

a sign bit field for incorporating sign data indicating a sign of the dividend data, the sign bit field being assigned a single bit positioned at the highest digit;

a hidden bit field for incorporating a hidden bit "1" indicating an integral value added to the fraction data, the hidden bit "1" being required for an actual calculation;

a fraction bit field for incorporating the fraction data such as the dividend data or the divisor data; and an adjusting field for adjusting the length of the bit format in the single-precision mode to that in the double-precision mode, the adjusting field being assigned two bits of "0".

Therefore, the bit field format represented by the single-precision mode occupies 54 bits in all. That is, the length of the bit field format utilized in the single-precision mode is equal to that utilized in the double-precision mode because of the existence of the adjusting fields.

Moreover, in the single-precision mode, two pieces of fraction data are incorporated in a single bit field format.

Turning to FIG. 2, one feature in the division operation performed by utilizing the floating-point division cell 21 is that two calculations are simultaneously performed in the single-precision mode in parallel. Another feature is that the calculation in the double-precision mode is performed in the same floating-point division cell 21.

With reference to FIG. 2, a first operation, which is the division operation performed in the floating-point division cell 21 in accordance with the single-precision mode, is described.

In the first operation, first and second dividend data and first and second divisor data are utilized as the fraction data. The first and second dividend data are initially stored in the partial remainder data register 22 in parallel and the first and second divisor data are initially stored in the divisor data register 23 in parallel. That is, the parallel-dividend data and the parallel-divisor data are incorporated in the bit field format shown in FIG. 4B.

Thereafter, to put it briefly, the first and second dividend data stored in the partial remainder data register 22 are independently subtracted from or added to the first and low-order multi-divisor data in the floating-point division cell 21 to calculate first and second partial remainder data.

Thereafter, the first and second partial remainder data are stored in the partial remainder data register 22 in parallel in exchange for the first and second dividend data. That is, the parallel-partial-remainder data is incorporated in the bit field format shown in FIG. 4B. Moreover, in the highest digit of each partial remainder data, the sign data of each partial remainder data is incorporated to designate the addition operation or the subtraction operation performed in the high-order and low-order partial remainder calculators 26, 29.

On the other hand, the first and second divisor data remain stored in the divisor data register 23 in parallel. The first partial remainder data is subtracted from or added to the high-order multi-divisor data as mentioned hereinafter in detail, while the second remainder data is subtracted from or added to the low-order multi-divisor data.

That is, the sign data attached to the first partial remainder data and the first divisor data are transmitted to the high-order divisor data generator 28 so that the high-order divisor data with the sign data is generated. The high-order divisor data is equal to the first divisor data.

Then, the high-order divisor data with the sign data generated in the high-order divisor data generator 28 is transmitted to the high-order partial remainder calculator 29. In addition, the first partial remainder stored in the partial remainder data register 22 is transmitted to the high-order partial remainder calculator 29.

Therefore, in the high-order partial remainder calculator 29, the high-order multi-divisor data with the sign data is obtained by multiplying the high-order divisor data with the sign data and a multiple of 2 together. Then the new high-order partial remainder data is calculated by subtracting or adding the high-order multi-divisor data from/to the high-order partial remainder data. The new high-order partial remainder data is equal to new first partial remainder data.

On the other hand, two pieces of sign data attached to the second partial remainder data and the first partial remainder data are transmitted to the sign selector 24. In the sign selector 24, because the first operation is performed in the single-precision mode, the sign data attached to the second partial remainder data is selected under the control of the external control signal, so that the selected sign data is transmitted to the low-order divisor data generator 25. In addition, the second divisor data is transmitted to the low-order divisor data generator 25.

In the low-order divisor data generator 25, the low-order divisor data with the sign data is generated. The low-order divisor data is equal to the second divisor data.

Then, the low-order divisor data with the sign data generated in the low-order divisor data generator 25 is transmitted to the low-order partial remainder calculator 26. In addition, the second partial remainder stored in the partial remainder data register 25 is transmitted to the low-order partial remainder calculator 26.

In the low-order partial remainder calculator 26, the new low-order partial remainder data is calculated in the same manner as in the high-order partial remainder calculator 29. The new low-order partial remainder data is equal to new second partial remainder data.

Thereafter, the new high-order partial remainder data calculated in the high-order partial remainder calculator 29 is transmitted to the partial remainder data register 22 and incorporated in the high-order section of the remainder format. In addition, the new low-order partial remainder data calculated in the low-order partial remainder calculator 26 is transmitted to the partial remainder data register 22 and incorporated in the low-order section of the remainder format.

Therefore, the new high-order partial remainder data and the new low-order partial remainder data are respectively subtracted from or added to the corresponding multi-divisor data once more.

Next, a second operation that the division operation is performed in the floating-point division cell 21 in the double-precision mode is described.

In the second operation, third dividend data and third divisor data are utilized as the fraction data. The third dividend data is initially stored in the partial remainder data register 23 and the third divisor data is initially stored in the divisor data register 23. That is, the third dividend data and the third divisor data are respectively incorporated in the bit field format shown in FIG. 4A.

Thereafter, to put it briefly, the high-order and low-order portions of the third dividend data stored in the partial remainder data register 22 are subtracted from or added to the high-order multi-divisor data and the low-order multi-divisor data in the floating-point division cell 21 to calculate third partial remainder data.

Thereafter, the third partial remainder data is stored in the partial remainder data register 22 in exchange for the third dividend data. That is, the third remainder data is incorporated in the bit field format shown in FIG. 4A. Therefore, in the highest digit of the third partial remainder data, the sign data of the third partial remainder data is incorporated to designate the addition operation or the subtraction operation performed in the high-order and low-order partial remainder calculators 26, 29.

On the other hand, the third divisor data remains stored, in the divisor data register 23.

The third partial remainder data stored in the partial remainder data register 22 is subtracted from or added to the high-order multi-divisor data and the low-order multi-divisor data to obtain new partial remainder data as described hereinafter in detail.

That is, the high-order portion of the third partial remainder data is transmitted to the high-order partial remainder data calculator 29, while the low-order portion of the third partial remainder data is transmitted to the low-order partial remainder data calculator 26. The third partial remainder data is formed by combining the high-order portion and the low-order portion.

Moreover, the high-order portion of the third divisor data is transmitted to the high-order divisor data generator 28, while the low-order portion of the third divisor data is transmitted to the low-order divisor data generator 25. The third divisor data is formed by combining the high-order portion and the low-order portion. Further, both the sign data attached to the high-order portion of the third partial remainder data and a bit position at the highest digit in the low-order portion of the third partial remainder data are transmitted to the sign selector 24. In the sign selector 24, because the second operation is performed in the double-precision mode, the sign data attached to the high-order portion of the third partial remainder data is selected under the control of the external control signal, so that the selected sign data is transmitted to the low-order divisor data generator 25.

In the low-order divisor data generator 25, the sign data selected by the sign selector 24 is combined with the low-order portion of the third divisor data so that the low-order divisor data with the sign data is generated. In the same manner, in the high-order divisor data generator 28, the sign data incorporated in the high-order portion of the third partial remainder data is received, and then the high-order divisor data with the sign data is generated.

Thereafter, in the low-order partial remainder calculator 26, the low-order portion of new third partial remainder data is calculated in the same manner as in the single-precision mode. In addition, when the addition operation is performed in the low-order partial remainder calculator 26, there is the possibility that a carry operation occurs because the number of bits in the low-order portion of new third partial remainder data is increased by the addition operation in comparison with that in the low-order portion of the third partial remainder data. Therefore, the carry data "1" is generated in the low-order partial remainder calculator 26 in cases where the carry operation occurs, while it is considered that the carry data "0" is generated in cases where no carry operation occurs. The carry data "1" or "0" is transmitted to the high-order partial remainder calculator 29 through the carry data selector 27 under the control of the external control signal, while a "0" bit is always transmitted to the high-order partial remainder calculator 29 from the carry data selector 27 in the first operation according to the single-precision mode under the control of the external control signal.

On the other hand, in the high-order partial remainder calculator 29, the high-order portion of new third partial remainder data is calculated in the same manner as in the single-precision mode. In addition, the carry data "1" or "0" transmitted from the carry data selector 27 is added to the lowest digit of the high-order portion of the new partial remainder data.

Thereafter, the high-order portion of the new third partial remainder data calculated in the high-order partial remainder calculator 29 is transmitted to the partial remainder data register 22 and incorporated in the high-order section of the remainder format. In addition, the low-order portion of the new third partial remainder data calculated in the low-order partial remainder calculator 26 is transmitted to the partial remainder data register 22 and incorporated in the low-order section of the remainder format.

Therefore, the high-order and low-order portions of the new third partial remainder data are subtracted from or added to the high-order and low-order multi-divisor data in the floating-point division cell 21 once more.

Accordingly, because the new third partial remainder data is formed by combing the high-order portion of the new third partial remainder data with the low-order portion of the new third partial remainder data, the dividend data provided to the partial remainder data register 22 can be subtracted or added by the multi-divisor data to calculate partial remainder data in the floating-point division cell 21. Thereafter, by repeating the division operation in the floating-point cell 21 or setting a plurality of the floating-point cells 21 in an array, the partial remainder data can be subtracted or added repeatedly until the quotient data is calculated.

In the floating-point division cell 21 shown in FIG. 2, though only the configuration for processing the fraction data is shown as mentioned above, an arithmetic circuit for processing the exponent data is also needed. However, because the number of bits in the exponent section is extremely small as shown in FIG. 3, the size of the arithmetic circuit for processing the exponent data is extremely small in comparison with an arithmetic circuit for processing the fraction data.

Moreover, selectors for changing the division operation between the single-precision mode and the double-precision mode can be structured by only dozens of transistors.

Therefore, even if the circuit including the arithmetic circuit for processing the exponent data is structured according to the present invention, the size of the circuit is not increased very much.

Moreover, in the floating-point division cell 21 shown in FIG. 2, the partial remainder is represented by the carry save type to efficiently perform the division calculation.

Further, the low-order partial remainder calculator 26 and the high-order partial remainder calculator 29 are respectively structured by the carry save adder to process the partial remainder represented by the carry save type.

Accordingly, two pieces of dividend data can simultaneously be processed in the single-precision mode without significantly increasing the size of the floating-point cell. In other words, the circuit of the floating-point cell can be efficiently utilized.

Moreover, the calculation in the double-precision mode can be performed by changing the selection in the sign selector 24 and the carry data selector 27 in the same floating-point division cell 21. That is, both types of calculations in accordance with the double-precision mode and the single-precision mode can selectively be performed.

Further, the division calculation can efficiently be performed.

In the floating-point division cell 21 according to the present invention, the sign data selected in the sign selector 24 is utilized for processing the low-order portion of the data stored in the partial remainder data register 22. However the present invention is not limited by the above embodiment. That is, in cases where the sign data is incorporated in the lowest digit of the partial remainder data register 22, the sign data selected in the sign selector 24 can be utilized for processing the high-order portion of the data stored in the partial remainder data register 22. That is, the high-order portion and the low-order portion can be inverted with each other in accordance with the concept of the present invention.

Next, a floating-point divider assembled by one or more floating-point division cells 21 is described.

Figure 5:
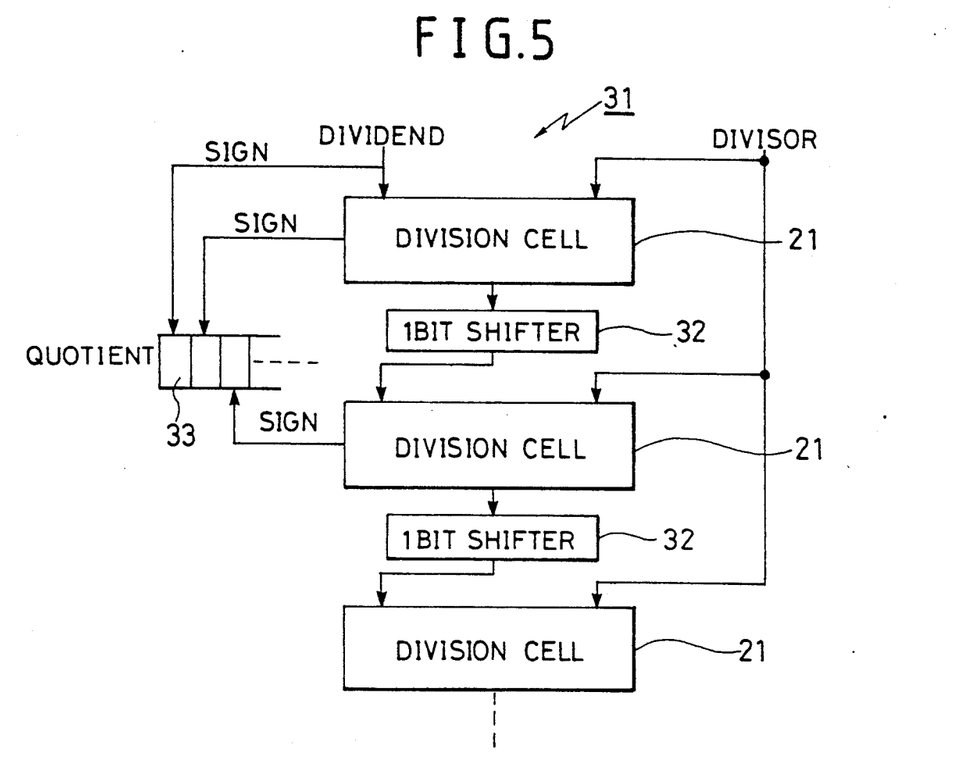
FIG. 5 is a structural block diagram of a floating-point divider which is formed by an array of the floating-point division cells shown in FIG. 2.

FIG. 5 is a structural block diagram of a floating-point divider which is formed by an array of the floating-point cells 21.

As shown in FIG. 5, a floating-point divider 31 for calculating quotient data by utilizing dividend data and divisor data, comprises:

a plurality of floating-point cells 21 which are set in an array in the longitudinal direction;

a plurality of bit shifters 32 for shifting partial remainder data which is formed by combining two pieces of data provided from the high-order and low-order partial remainder calculators 26, 29 positioned in the floating-point division cell 21, the partial remainder data being shifted to the left direction by one bit; and a quotient register 33 for storing the sign data attached to the dividend data in the highest digit (the left-hand side in FIG. 5) and storing the sign data attached to the partial remainder data calculated in the floating-point cells 21 in turn.

In the above configuration, the quotient data is determined as a series of the sign data which is provided from the dividend data and the floating-point cells 21.

The architecture in the floating-point divider 31 is the same as the conventional floating-point divider, except that the floating-point divider 31 according to the present invention is formed by the floating-point cells 21. Therefore, the operation in the floating-point divider is well-known so that a detailed description of the operation is omitted.

Accordingly, the division operation in the floating-point divider 31 is performed at a high speed because synchronization signals are not utilized, while the floating-point divider 31 is large.

Figure 6:
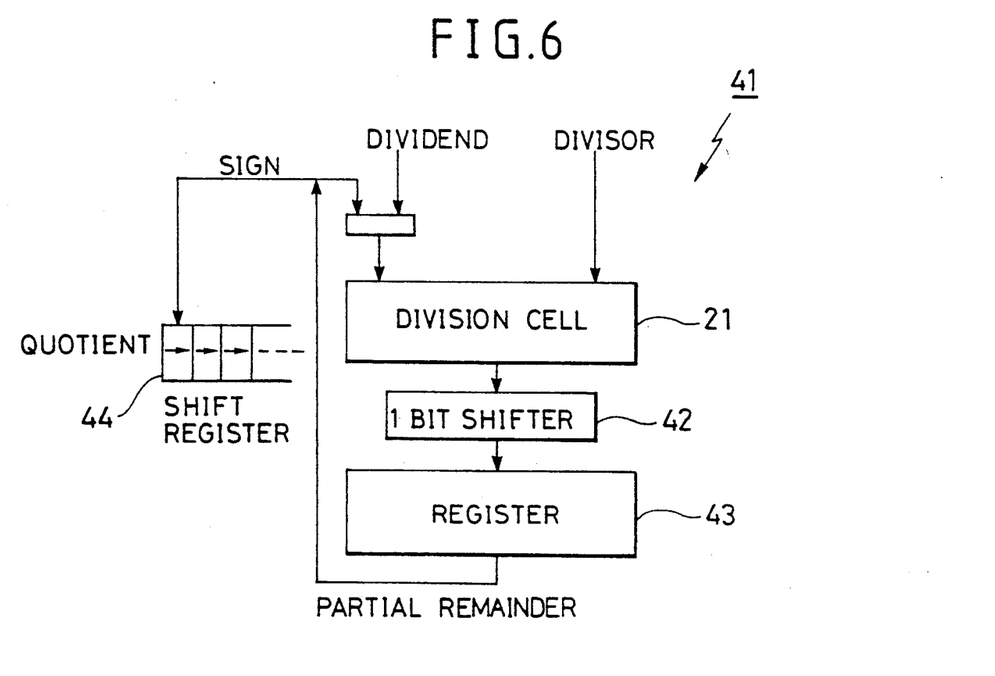
FIG. 6 is a structural block diagram of a floating-point divider which is formed by a single floating-point division cell shown in FIG. 2.

FIG. 6 is a structural block diagram of a floating-point analog divider which is formed by a single floating-point division cell 21.

As shown in FIG. 6, a floating-point divider 41 for calculating quotient data by utilizing dividend data and divisor data, comprises:

the floating-point division cell 21 for dividing the dividend data by the divisor data to obtain partial remainder data which is formed by combining two pieces of data provided from the high-order and low-order partial remainder calculators 26, 29 and repeatedly dividing the partial remainder data by the divisor data until the quotient data is obtain;

a bit shifter 42 for shifting the partial remainder data provided from the floating-point division cell 21, the partial remainder data being shifted to the left by one bit;

a partial remainder register 43 for storing the partial remainder data shifted by the bit shifter 42; and a quotient shift register 44 for storing the sign data attached to the dividend data and repeatedly storing the sign data attached to the partial remainder data stored in the partial remainder register 43 while shifting the stored sign data for each registration of the sign data, a series of the sign stored in the quotient shift register 44 forming the quotient data.

In the above configuration, the division operations performed in the floating-point division cell 21, the bit shifter 42, the partial remainder register 43, and the quotient shift register 44 are synchronized by synchronization signals provided from a prescribed clock under the control of a prescribed controller.

Therefore, the division operation is repeatedly performed at regular intervals in the floating-point division cell 21 until the quotient data is obtained.

The architecture in the floating-point divider 41 is the same as in the conventional floating-point divider, except that the floating-point divider 41 according to the present invention is formed by the floating-point division cell 21. Therefore, the operation in the floating-point divider is well-known so that a detailed description of the operation is omitted.

Accordingly, the floating-point divider 31 can be small in comparison with the floating-point divider 41, while the repeated division operations in the floating-point divider 41 are not performed at a high speed because the floating-point division cell 21 is operated at regular intervals while being synchronized by the synchronization signals for each division operation even if one of the division operations is quickly finished in the floating-point divider 41.

Moreover, in the floating-point divider according to the present invention, the repetitive operation such as picture data processing and vector arithmetic can efficiently be utilized.

Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

What is claimed is:

1. A floating-point division cell for calculating new partial remainder data by subtracting or adding multi-divisor data, which is obtained by multiplying divisor data incorporated in a divisor format and a multiple of 2 together, from/to partial remainder data in which sign data is attached to the highest digit of a remainder format, comprising:

partial remainder data storing means for registering either parallel-partial-remainder data, in which first partial remainder data is incorporated in a high-order section of the remainder format and second partial remainder data is incorporated in a low-order section of the remainder format, or third partial remainder data is incorporated in an entire section of the remainder format;

divisor data storing means for storing either parallel-divisor data, in which first divisor data corresponding to the first partial remainder data is incorporated in a high-order section of the divisor format and second divisor data corresponding to the second partial remainder data is incorporated in a low-order section of the divisor format, or third divisor data, corresponding to the third partial remainder, is incorporated in an entire section of the divisor format;

sign selecting means for selecting the sign data attached to the second partial remainder data in cases where the parallel-partial-remainder data is stored in the partial remainder data storing means and selecting the sign data attached to the third partial remainder data in cases where the third partial remainder data is stored in the partial remainder data storing means, the selection of the sign data being controlled by an external control signal;

low-order divisor data generating means for receiving both the sign data selected in the sign selecting means and the low-order portion of the divisor data stored in the divisor data storing means and generating low-order divisor data with the sign data;

low-order partial remainder calculating means for
   (1) obtaining low-order multi-divisor data by multiplying the low-order divisor data with the sign data generated in the low-order divisor data generating means and a multiple of 2 together and
   (2) calculating new low-order partial remainder data by subtracting or adding the low-order multi-divisor data from/to the low-order portion of the partial remainder data stored in the partial remainder data storing means;

carry data selecting means for
   (1) selecting carry data carried by the calculation performed in the low-order partial remainder calculating means in cases where the third partial remainder data is stored in the partial remainder data storing means and
   (2) selecting a "0" bit in cases where the parallel-partial-remainder data is stored in the partial remainder data storing means, the selection of either the carry data or the "0" bit being controlled by the external control signal;

high-order divisor data generating means for receiving both the sign data attached to the first or third divisor data stored in the partial remainder data storing means and the high-order portion of the divisor data stored in the divisor data storing means and generating high-order divisor data with the sign data; and high-order partial remainder calculating means for
   (1) obtaining high-order multi-divisor data by multiplying the high-order divisor data with the sign data generated in the high-order divisor data generating means and a multiple of 2 together,
   (2) calculating new high-order partial remainder data by subtracting or adding the high-order multi-divisor data from/to the high-order portion of the partial remainder data stored in the partial remainder data storing means, and
   (3) adding either the carry data or the "0" bit selected by the carry data selecting means to the lowest digit of the new high-order partial remainder data.

2. The division cell according to claim 1 in which the high-order partial remainder calculating means and the low-order partial remainder calculating means are respectively formed by carry save adders in which the partial remainder represented by a carry save type is subtracted or added.

3. The division cell according to claim 1 in which the first partial remainder data and the second partial remainder data stored in the partial remainder data storing means are respectively represented by a single-precision mode and the third partial remainder data is represented by a double-precision mode.

* * * * *